March 17, 1942.   N. ERLAND AF KLEEN   2,276,948
ABSORPTION REFRIGERATING APPARATUS
Filed July 2, 1940   7 Sheets-Sheet 1

*Fig. 1.*

INVENTOR.
Nils Erland af Kleen
BY C. P. Goepel
his ATTORNEY.

March 17, 1942.   N. ERLAND AF KLEEN   2,276,948
ABSORPTION REFRIGERATING APPARATUS
Filed July 2, 1940    7 Sheets-Sheet 3

INVENTOR.
Nils Erland af Kleen
BY C. P. Goepel
his ATTORNEY.

March 17, 1942.  N. ERLAND AF KLEEN  2,276,948
ABSORPTION REFRIGERATING APPARATUS
Filed July 2, 1940  7 Sheets-Sheet 5

Fig. 8.

INVENTOR.
Nils Erland af Kleen
BY C. P. Goepel
his ATTORNEY.

Fig. 10.

Patented Mar. 17, 1942

2,276,948

UNITED STATES PATENT OFFICE 2,276,948

ABSORPTION REFRIGERATING APPARATUS

Nils Erland af Kleen, Stockholm, Sweden

Application July 2, 1940, Serial No. 343,520

8 Claims. (Cl. 62—5)

This invention relates to absorption refrigerating systems of the kind comprising two or more boiler absorbers arranged to work in cyclic order so as to maintain a substantially continuous refrigeration. Such systems usually have two boiler absorbers which work alternately so that when one boiler absorber is generating, the other is absorbing The object of the present invention is to improve the efficiency of such system, and the invention consists essentially in the provision of means for effecting heat-exchange between boiler absorbers during certain factions of the working cycle, so that the heat stored in one boiler absorber at the end of its generating period is used to warm up the other boiler absorber in preparation for the generating period of the latter.

In the operation of a system of the kind described, the temperature of the boiler absorber rises to a maximum at the end of the generating period and its temperature must be rapidly lowered at the beginning of the absorbing period. At the beginning of the generating period, on the other hand, the boiler absorber requires to be heated up so that when two boiler absorbers are working alternately heat is required for raising the temperature of one boiler absorber at a time when the other boiler absorber requires to be cooled down from a high temperature. The heat from one boiler absorber just being in generating phase will, during its first cooling down period supply heat to the other boiler absorber to heat up the same to a point where the refrigerant starts to drive out.

The present invention takes advantage of these conditions by utilizing the heat of the boiler which has reached the end of its generating period to assist in raising the temperature of the other boiler absorber, for the purpose of initiating the generating period of the latter.

The heat-exchanging system may consist of a jacket or other chamber in thermal contact with the first boiler absorber and connected by flow and return pipes to a similar jacket or chamber associated with the second boiler absorber, so that a closed circulating system is formed which may be filled with any suitable fluid capable of taking up heat from one boiler absorber and delivering the heat to the other boiler absorber. The heat-exchanging system can also consist of a separate circulating system. The system may be controlled by a valve or valves operated automatically by thermostatic control mechanism arranged so that circulation is permitted during the initial cooling period of one boiler absorber but is arrested before the temperature of the boiler absorber being cooled falls below the temperature of the boiler absorber which is being heated up. The circulating fluid may have a boiling point so adjusted that the fluid boils in the jacket or chamber associated with the hotter boiler absorber and condenses in the jacket or chamber associated with the cooler boiler absorber. The circulating system may involve a reservoir or collecting chamber arranged to collect the condensed fluid at the end of the heat-exchanging period.

If desired a condenser or condensers may be interposed in the return pipe which connects the lower ends of the two jackets, so as to effect condensation of the cooling fluid on its way from the warmer cooling jacket to the colder one.

When a condenser or condensers is or are so arranged, the sensible heat of the vapour delivered from the cooling jacket of the hot boiler absorber will be relied upon to warm the cold boiler absorber, and the further loss of heat from the circulating fluid which occurs in the condenser or condensers, will increase the cooling effect of the system upon the hot boiler absorber, so as to accelerate the cooling of the latter. Such an arrangement is desirable because rapid cooling of the boiler absorber in the initial stage of the absorbing period is essential to efficient working of the refrigerating system, and the required rate of abstraction of heat from the hot boiler absorber is greater than the required rate of supply of heat to the cool boiler absorber.

It is also possible to utilize the secondary cooling system provided for cooling the boiler absorbers during their absorbing periods. For this purpose, means may be provided for diverting the condensed cooling fluid which normally returns from the condenser of the secondary cooling system direct to the boiler absorber in process of being cooled, so that this fluid passes through the boiler absorber which is being heated on its way from the condenser to the boiler absorber being cooled. A part of the sensible heat of the cooling fluid is thus utilized for the purpose of heating the second-mentioned boiler absorber. Before the temperature of the boiler absorber being cooled falls to the level of that of the boiler absorber being heated, or at a predetermined temperature when the refrigerant starts to be driven out from the boiler absorber generating period, the aforesaid diversion of cooling liquid is stopped and the further heating of one boiler absorber and cooling of the other boiler absorber then proceeds in the normal mannner.

The invention will be described in detail with reference to forms of construction of the same which are shown as examples in the accompanying drawings, in which.

Figure 2:
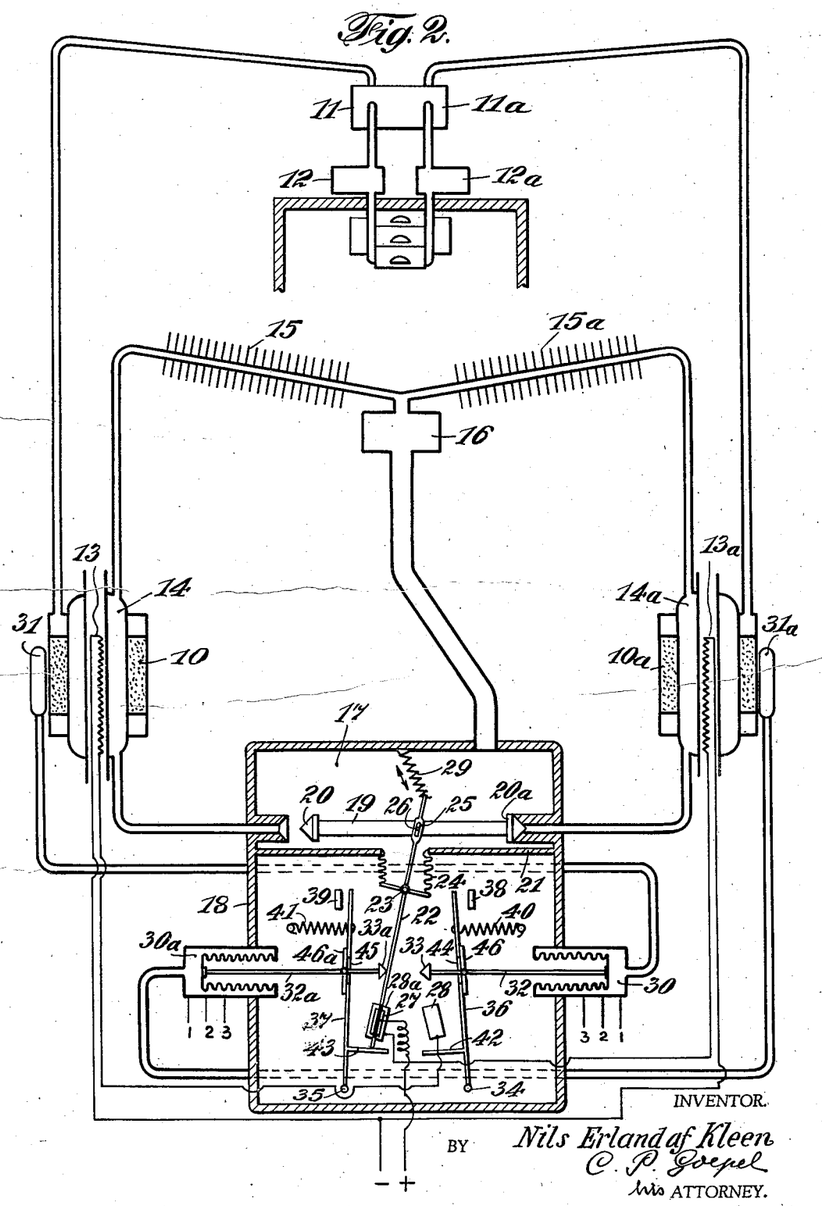
Fig. 2 is a diagrammatic view of the refrigerating apparatus including two units with certain parts shown in section and illustrating one form of mechanism for effecting a heat exchange between the cooling fluid of the two units, the parts of said mechanism occupying one of their fully closed positions.

In the drawings, referring more particularly to Fig. 2, there is shown an absorption refrigerating apparatus consisting of two units operable intermittently and alternately in the absorption phase and expulsion phases, respectively. The unit on the left hand side of the drawing includes the usual boiler absorber 10 charged with absorbent material, condenser 11, and evaporator 12, all connected together by suitable pipes or conduits and forming a closed system or primary circuit for the refrigerant; the unit shown on the right hand side includes a boiler absorber 10a, condenser 11a, and evaporator 12a, all connected together in series to form a similar closed system or primary circuit for the refrigerant. The boiler absorbers 10 and 10a are alternately heated for the expulsion phase operation of the units by any suitable means such as electric heat cartridges 13 and 13a, respectively, controlled by a switch mechanism hereinafter described in detail.

For the absorption phase operation of each unit, the boiler absorbers 10 and 10a are alternately cooled by means of a cooling medium flowing through a secondary system or circuit formed by the usual boiler absorber jackets 14 and 14a, condensers 15 and 15a, common collecting tank 16, and common valve chamber 17, all connected by pipe lines as shown in the drawings. The valve chamber 17 in this form of the invention is located in the upper portion of a housing or casing 18, and interposed in the valve chamber and reciprocable therein is a valve rod 19 carrying a pair of valves 20 and 20a cooperating with respective valve seats in the valve chamber for controlling the flow of the cooling medium to the corresponding boiler absorber jackets 14 and 14a. A horizontal partition 21 separates the valve chamber 17 from the lower portion of the casing 18, and substantially in the central portion of said partition is an opening through which projects the upper portion of switch lever 22 secured as at 23 to a flexible bellows diaphragm arrangement 24 adjacent the opening in the partition which forms a fulcrum for the switch lever 22. The upper end of the switch lever has a longitudinal slot 25 for receiving a transverse pin 26 on the valve rod 19 whereby movement of the switch lever is transmitted to the valve rod 19 to shift the same in the valve chamber 17. The lower end of the lever 22 carries a contact member 27 connected to a suitable source of electric current and adapted to cooperate with a pair of complementary contact members 28 and 28a secured in the casing 18 and in electrical circuit with respective heat cartridges 13 and 13a. As lever 22 is rocked on its fulcrum 23, the contact member 27 will engage complementary contact 28 or 28a to close the circuit to the cartridge 13 or 13a and this rocking movement of the switch lever 22 is transmitted to the valve rod 19 to close the valve 20 or 20a upon its seat. Spring 29 secured at one end of the casing 18 in the valve chamber 17 cooperates at its other end with the upper portion of the switch lever 22 to normally urge the latter toward its extreme valve closing positions.

Figure 3:
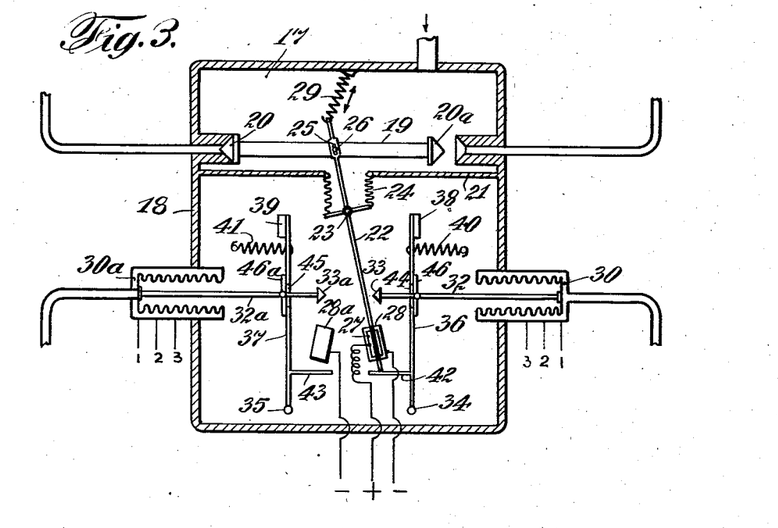
Fig. 3 is a horizontal sectional detail of the mechanism illustrated in Fig. 2 with the parts occupying the other fully closed position.

The mechanism for selectively rocking the switch lever 22 comprises a pair of pressure responsive devices in the form of bellows diaphragms 30 and 30a in the side walls of the casing 18 below the valve chamber 17 and operable to three positions indicated by numerals 1, 2 and 3 in the drawings. As shown in Fig. 3, the bellows diaphragms 30 and 30a are oppositely disposed and are responsive to fluid systems 31 and 31a in thermal contact with the boiler absorbers 10 and 10a, respectively. The bellows diaphram 30 and 30a carry operating rods 32 and 32a, respectively, extending inwardly into the casing 18 and terminating in contact faces 33 and 33a adapted to engage opposite sides of the lever 22 to selectively rock the latter to its extreme valve closing and corresponding heat cartridge energizing positions. A pair of levers 36 and 37 pivotally mounted in the lower portion of the casing 18 as at 34 and 35 extend upwardly in the casing and are normally maintained in engagement at their upper end with fixed abutments 38 and 39, respectively, by springs 40 and 41. The levers 36 and 37 are provided adjacent their lower ends with arms 42 and 43 projecting inwardly toward one another and lying in the path of movement of the lower end of the switch lever 22 to prevent the latter from being rocked to its extreme positions as will hereinafter appear. Each lever 36 and 37 has a longitudinal slot 44 and 45, respectively, intermediate its ends through which projects the free end of the operating rods 32 and 32a, and adjacent said slots tranverse members 46 and 46a are pivotally secured to respective rods 32 and 32a to move the corresponding levers 36 and 37 inwardly from their abutments 38 and 39 during the inward movement of the bellows diaphragms 30 and 30a.

Figure 1:
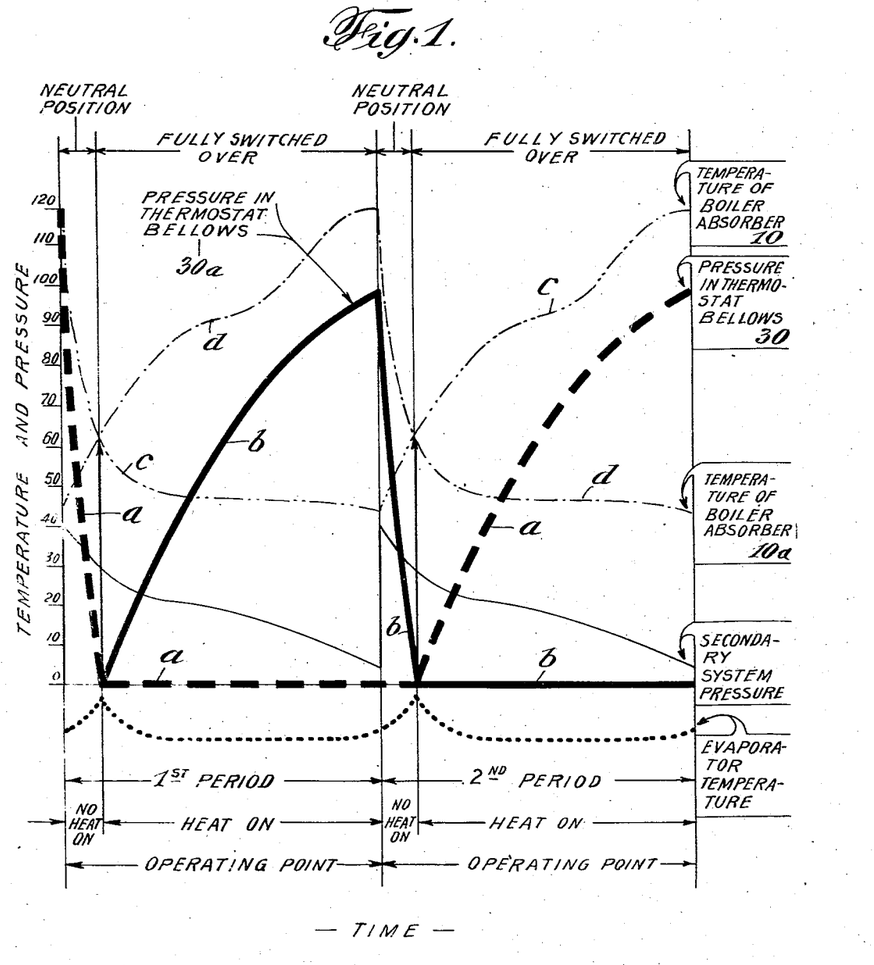
Fig. 1 is a time-temperature-pressure diagram for a complete cycle of operation of the absorption refrigerating apparatus in accordance with the present invention.

Having described the construction of one form of the invention its operation is as follows:

With the parts occupying the position shown in Fig. 2, the circuit to the heat cartridge 13a is closed and the boiler absorber 10a is being heated for the expulsion phase operation of the unit shown in the right hand side of Fig. 2. During this heating the pressure in the system 31a will gradually increase as shown in Fig. 1 by the heavy solid line b to correspondingly move the bellows diaphragm 30a towards its No. 3 position. On the other hand, the unit on the left is operating in the absorption phase; that is, the heat cartridge 13 is not energized and the valve 20 is open to allow the cooling medium to circulate through the boiler absorber jacket 14 to cool boiler absorber 10. This will correspondingly cool the system 31 reducing the pressure as shown by the heavy broken line a in Fig. 1 on the bellows 30 so that the spring 40 acting upon lever 36 returns bellows 30 toward its No. 1 position.

The temperature in boiler absorber 10 is indicated by dot and dash line c while the temperature in boiler absorber 10a is indicated by dot and dash line d in Fig. 1.

When the desired temperature has been reached in boiler absorber 10a, the pressure in system 31a has reached its upper operating limit as shown in Fig. 1. The bellows 30a has moved to its No. 3 position, and the switch lever 33 has been rocked by the contact face 33a on rod 32a to break the circuit to heat cartridge 13a. Bellows 30 having returned to its No. 1 position due to the drop in pressure in the system 31, the arm 42 on lever 36 has thus been brought into the path of the switch lever 32 to prevent the latter from being rocked by its spring 29 to its opposite extreme position. This intermediate or neutral position of the switch lever 22 holds both valves 20 and 20a open, allowing the cooling fluid to circulate through both boiler absorber jackets 14 and 14a.

The circulation of the cooling fluid from one boiler jacket to the other through the valve chamber 17 effects a heat exchange between both boiler absorbers to quickly cool boiler absorber 10a and gradually heat boiler absorber 10 while both heat cartridges 13 and 13a are de-energized. In other words, in cooling boiler absorber 10a, the cooling fluid absorbs the heat therefrom and delivers it to boiler absorber 10 to pre-heat the latter prior to operation of the heat cartridge 13. The switch lever 22 will remain in its intermediate or neutral position until the temperature in boiler absorber 10a falls below that in boiler absorber 10 when bellows diaphragm 30 has moved from its No. 1 position to its No. 2 position to rock lever 36 toward the left so that arm 42 carried thereby will be moved below the lower end of the switch lever 22 to permit spring 29 to rock said switch lever to its other extreme position as shown in Fig. 3, closing valve 20 on its seat and shifting contact 27 on contact 28 to energize heat cartridge 13.

Figure 4:
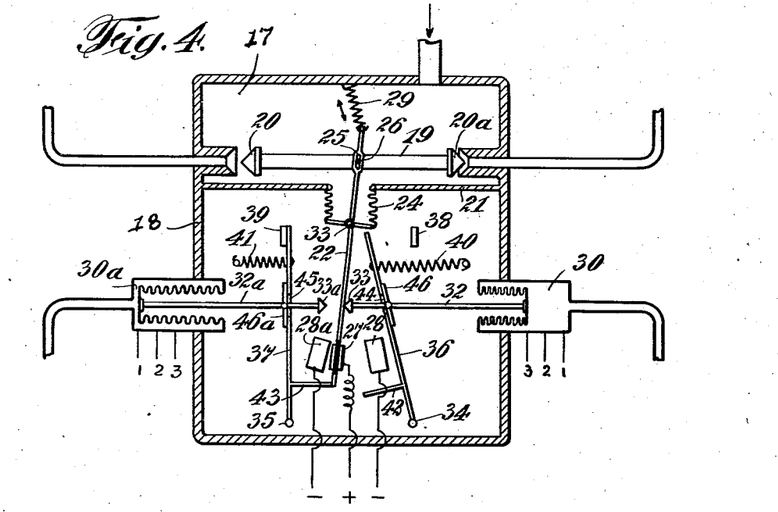
Fig. 4 is a similar view, but showing the parts of the mechanism occupying an intermediate or neutral position.

For the second period of the apparatus, the operation is repeated but with the parts operating in the opposite direction. In other words, the switch lever 22 will first be moved toward the left by the bellows 30 when the desired amount of heat has been attained for the boiler absorber 10, shutting off the current to the heat cartridge 13 and opening valve 20 without completely closing valve 20a, as illustrated in Fig. 4. The switch lever 22 will remain in this intermediate position until the temperature in boiler absorber 10a has been raised a sufficient amount to actuate bellows 30a from its No. 1 position to its No. 3 position to disengage the stop arm 43 from the lower end of the switch lever 22 to permit the latter to be rocked by the spring 29 to its extreme position completely closing valve 20a and energizing heat cartridge 13a as shown in Fig. 2. It will thus be seen that during the operation of the apparatus, the switch mechanism hereinabove described effects a considerable saving in applied heat and correspondingly increases the efficiency of the entire system in that it enables a rapid cooling of the boiler absorber for the absorption phase operation thereof and at the same time enables the heat taken from the hot boiler absorber to initially raise the temperature in a second boiler absorber for the expulsion phase operation of the latter.

While in the foregoing form of the invention the switch lever is operated from an extreme position to an intermediate position by one bellows diaphragm and released from its intermediate position to its other extreme position by the action of a second bellows diaphragm, the invention can also be used in connection with oppositely disposed bellows wherein each bellows operates first to rock the switch lever from one extreme position to an intermediate position and then release the switch lever from its intermediate position to be rocked to its other extreme position.

Figure 5:
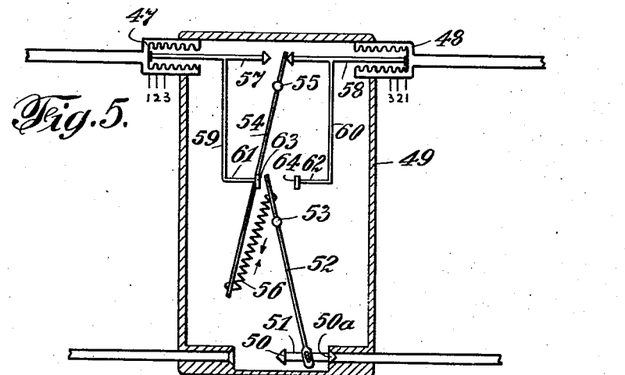
Fig. 5 is a horizontal sectional detail view of a modified form of mechanism with the parts occupying one of the fully closed positions.
Figure 6:
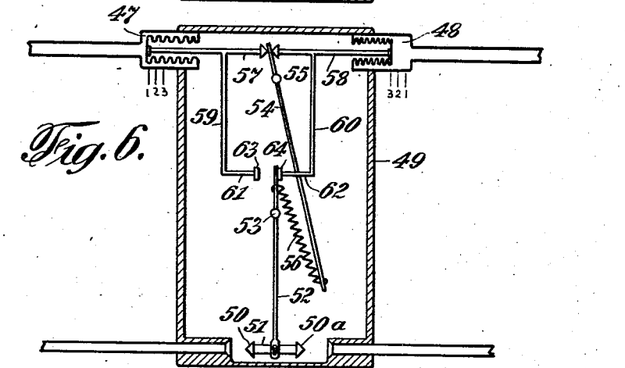
Fig. 6 is a view similar to Fig. 5, but showing the parts in an intermediate or neutral position.
Figure 7:
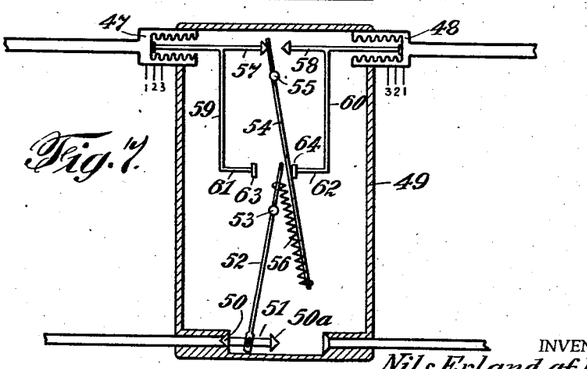
Fig. 7 is a similar view but showing the parts in the other fully closed positions.

Figs. 5, 6 and 7 show such an arrangement comprising a pair of bellows 47 and 48, similar to bellows 30 and 30a heretofore described, disposed on opposite sides of a valve chamber 49 and responsive to pressures in separate fluid systems in thermal contact with respective boiler absorbers (not shown). In the form illustrated valves 50 and 50a on opposite ends of a valve rod 51 are disposed in the lower portion of the chamber 49. The valve rod is operatively connected to the lower end of a valve operating lever 52 pivoted at 53 in the chamber 49. A second lever 54 pivoted at 55 in the upper portion of the chamber 49 and spaced axially from the pivoted lever 52 extends downwardly and is operatively connected at its lower end to the upper end of lever 52 by means of a coil spring 56 which normally urges both of said levers 52 and 54 toward one another.

Plunger rods 57 and 58 secured to bellows 47 and 48 respectively terminate at their free ends in contact faces on each side of the upper end of lever 54 to selectively rock the latter in opposite directions on the pivot 55 upon movement of the bellows 47 and 48. Intermediate the ends of the plunger rods 57 and 58 and extending downwardly therefrom is a pair of legs 59 and 60, respectively, each of which terminates in an inwardly extending portion 61 and 62, respectively, carrying abutments 63 and 64 adapted to cooperate with the upper end of valve operating lever 52.

In operation, referring first to Fig. 5 wherein the valve 50a is closed and the bellows 47 and 48 are in their No. 1 positions, when the desired amount of heat has been obtained in the boiler absorber operating in the expulsion phase, the bellows 48 will first be moved to its No. 2 position, rocking lever 54 on its pivot 55 so that it lies substantially vertical in the chamber 49. Further movement of the bellows 48 toward its No. 3 position will shift lever 54 past the vertical position to the position shown in Fig. 6. Spring 56 will then urge valve operating lever 52 toward its opposite valve closing position. However, abutment 64 on the arm 62 will engage the upper portion of valve operating lever 52 to hold the latter in an intermediate position opening both valves 50 and 50a and permitting cooling fluid to circulate from one boiler to the other. As soon as the temperature in the boiler absorber in thermal contact with bellows 48 drops below the temperature in the other boiler absorber, the bellows 48 will move back towards its No. 1 position, as shown in Fig. 7, permitting the valve operating lever 52 to be rocked to its extreme valve closing position by the spring 56 to close valve 50 on its seat.

The operation for the second period is the same, but with bellows 47 operating lever 54 to reverse the operation of the valve lever 52.

Figure 8:
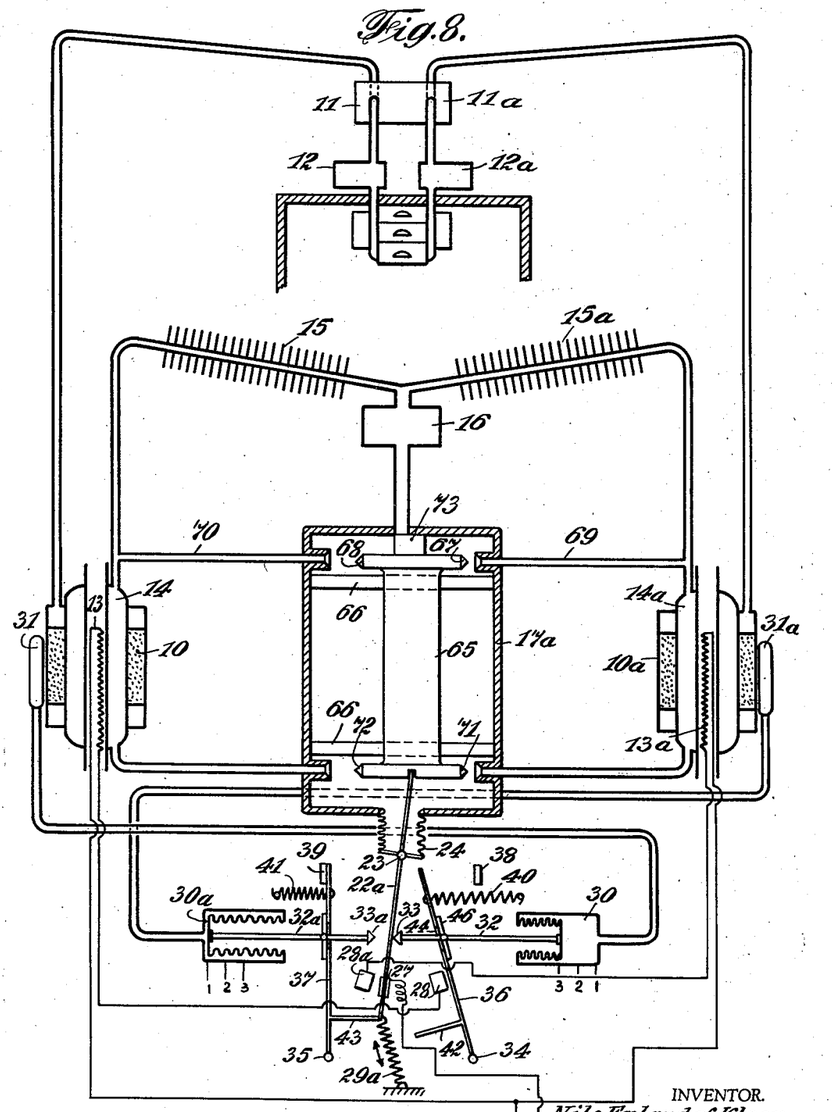
Fig. 8 is a diagrammatic view similar to Fig. 2, but showing a modified form of valve arrangement.

The apparatus illustrated in Fig. 8 is similar to that shown in Fig. 2, with the exception of the valve arrangement in the valve chamber operable by the switch lever 22a. In this modified form the valve assembly comprises a valve block 65 slidable horizontally in guides 66 in the valve chamber 17a. The valve block 65 carries at its upper end a pair of oppositely disposed valves 67, 68 cooperating with respective valve seats in the chamber 17a for controlling the circulation of the cooling fluid through branch lines 69 and 70 in the lines leading from the boiler absorber jackets 14 and 14a, respectively, to the corresponding condensers 15 and 15a. A second pair of oppositely disposed valves 71 and 72 is provided on the lower portion of the valve block 65 cooperating with valve seats for controlling the circulation of cooling fluid from the valve chamber 17a through the main lines leading to the boiler absorber jackets 14 and 14a. A valve member 73 on the upper end of the valve block 65 and slidable therewith controls the flow of the cooling fluid from the collecting tank 16 to the valve chamber 17a.

In operation, movement of the switch lever 22a from one of its extreme positions to its intermediate position by the switch lever 22a and operating mechanism previously described in connection with Fig. 2, opens the valves 71, 72 and closes valve 73 and the cooling fluid will circulate from one boiler absorber to the other as previously described in connection with Fig. 2. When the switch lever 22a is rocked to its extreme position, the valve 73 will open and one set of valves 68—62 or 67—71 will remain open and the other set will be closed so that the cooling medium will circulate only through the boiler absorber operating in the absorption phase.

Figure 9:
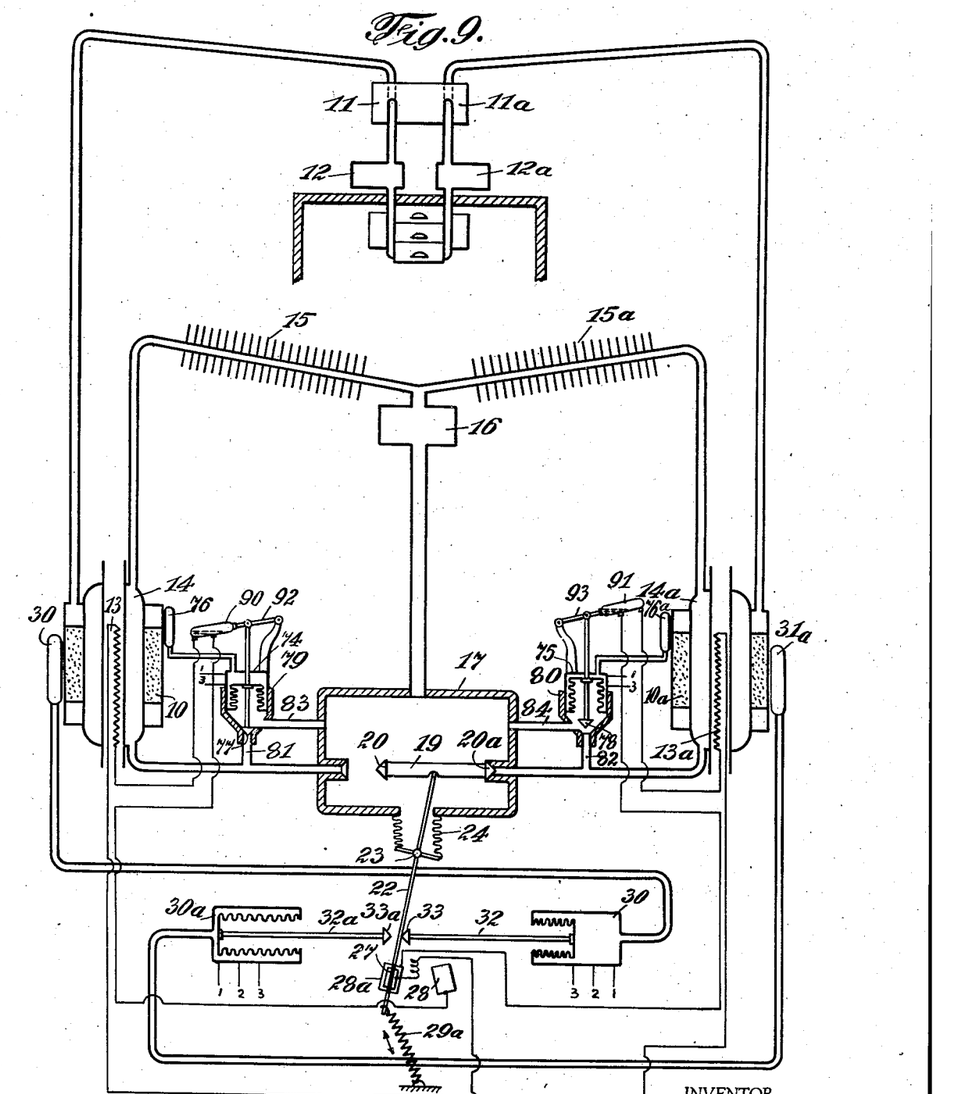
Fig. 9 is a similar view of another modification contemplated by the present invention.

Fig. 9 shows another embodiment of the present invention wherein the circulation of the cooling medium can be selectively controlled by auxiliary bellows 74 and 75 responsive to the pressure in auxiliary fluid systems 76 and 76a in thermal contact with boiler absorbers 10 and 10a, respectively. These auxiliary bellows 74 and 75 actuate valves 77 and 78 disposed in valve chambers 79 and 80 connected by branch lines 81 and 82 to the main lines of the cooling fluid of the secondary system. Branch lines 83 and 84 lead from the auxiliary valve chambers 79 and 80 to the main valve chamber 17 containing the main valves 20 and 20a operable by the switch lever 22. The auxiliary bellows 74 and 75 operate mercury switches 90 and 91 mounted on rocking levers 92 and 93 operatively connected to respective bellows 74 and 75 and movable therewith.

In this form of the invention, the mechanism heretofore described for maintaining the switch lever 22 in an intermediate or neutral position is eliminated and the switch lever is free to move from one full operating position as shown in Fig. 9 to the other full operating position by means of the operating rods 32 and 32a of bellows 30 and 30a, respectively. The auxiliary bellows 74 and 75 operate to maintain their respective valves 77 and 78 open until the temperature in the respective boiler absorbers 10 and 10a is raised from the lower cooling temperature to that corresponding to the "heat on" period shown in Fig. 1.

When the auxiliary valves 77 and 78 are open, the mercury switches 90 and 91 act to disconnect the circuit to the respective heat cartridges 13 and 13a. Thus, the cooling fluid can by-pass the closed main valve 20 or 20a to the corresponding auxiliary valve casing 79 or 80 and circulate through both boiler absorbers 10 and 10a until the desired pre-heating has been obtained therein, when the auxiliary fluid system 76 or 76a actuates its auxiliary bellows 74 or 75 to close the auxiliary valve 77 or 78 and rock mercury switch 90 or 91 to close the circuit to the respective heat cartridge.

In operation, with the parts occupying the position shown in Fig. 9, the switch lever 22 has just been rocked and valve 20 has been opened and heat cartridge 13 disconnected so that boiler absorber 10 is beginning to be cooled by the cooling medium. Contact 27 has been shifted to engage contact 28a in the circuit to the heat cartridge 13a and valve 20a has been closed. However, the auxiliary bellows 75 holds valve 78 open to permit the cooling medium to by-pass valve 28 and circulate from boiler absorber jacket 14 to jacket 14a to pre-heat boiler absorber 10a. During this period the mercury switch 91 keeps the circuit to the heat cartridge 13a open so that the latter is not energized. When the temperature in boiler absorber 10a reaches a predetermined point, the pressure in auxiliary fluid system 76a increases to close auxiliary valve 78, rocking mercury switch 91 and closing the circuit to the heat cartridge 13a. The parts will remain in this position until the desired amount of heating has been obtained in boiler absorber 10a when the fluid system 31a will operate bellows 30a to rock the switch lever 22 to the right, closing valve 20 and opening valve 28, and shifting contact 27 into engagement with contact 28. The auxiliary bellows 74 and mercury switch 90 then operate in the manner above described in connection with bellows 75 and mercury switch 91, to effect a heat exchange between boiler absorber 10a and boiler absorber 10 through the auxiliary valve 77, until boiler absorber 10 has been pre-heated sufficiently to permit auxiliary fluid 76 to close valve 77 and rock mercury switch 90 for completing the circuit to the heat cartridge 13.

Figure 10:
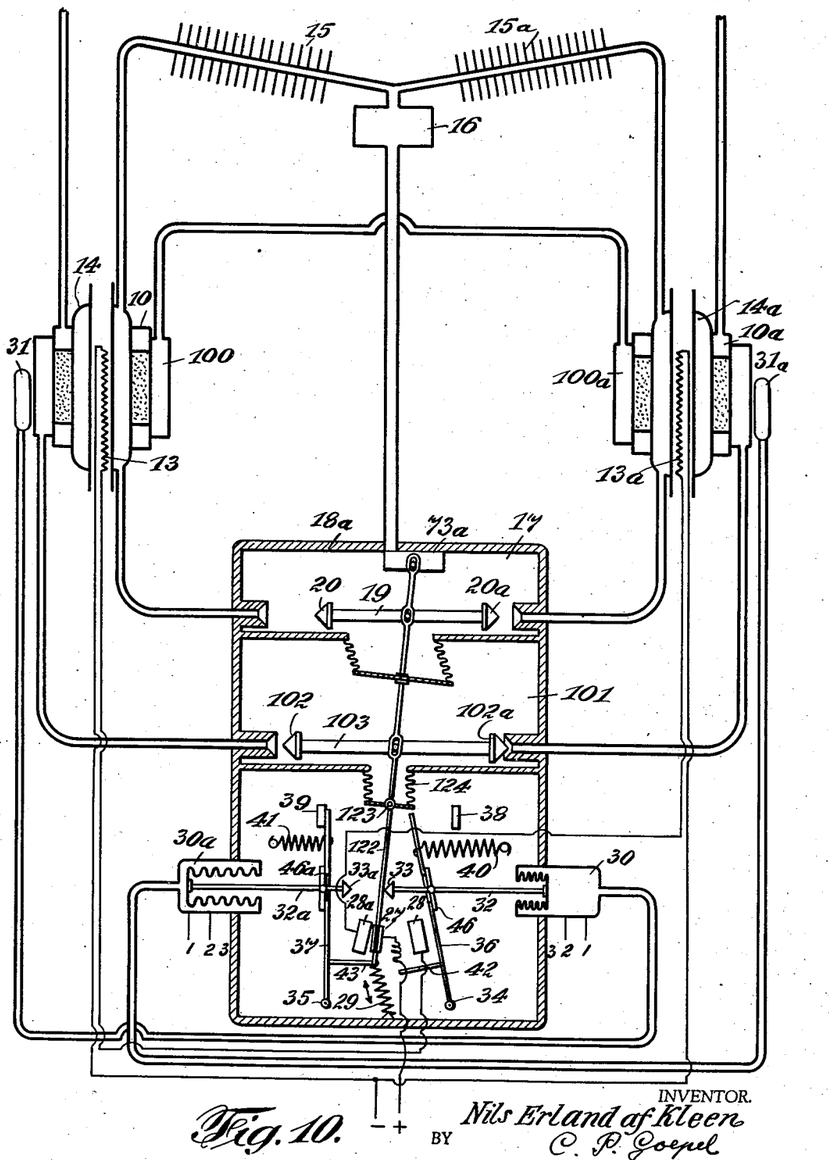
Fig. 10 is a similar view of a further modification.

In the modification shown in Fig. 10, the boiler absorbers 10 and 10a are cooled for the absorption phase operation of the units by two separate cooling systems. One of these systems is similar to that heretofore described and is formed by the inner boiler absorber jackets 14 and 14a, condensers 15 and 15a, collecting tank 16, and valve chamber 17, all connected by pipe-lines as shown in the drawings. The boiler absorbers 10 and 10a are provided with an outer cooling jacket 100 and 100a, respectively, connected together at their upper ends by a pipe-line and at their lower ends by pipe-lines leading to a common valve chamber 101 similar to valve chamber 17. Valves 20 and 20a on valve rod 19 operate in valve chamber 17 to control the circulation of the cooling medium to the respective boiler absorber jackets 14 and 14a, while valves 102 and 102a on valve rod 103 operate in valve chamber 101 to control the circulation of the cooling fluid to the outer boiler absorber jackets 100 and 100a. Both valve rods 19 and 103 are operated by a common switch lever 122 fulcrumed as at 123 to a bellows diaphragm arrangement 124 in the lower portion of valve chamber 101. The upper end of the switch lever 121 carries a valve block 73a slidable in the valve chamber 17 to control the flow of cooling medium from the collecting tank 16. The lower end of the switch lever 122 carries contact member 27 adapted to cooperate with contacts 28 and 28a for controlling the circuit to the electric heat cartridges 13 and 13a, respectively. The mechanism for rocking switch lever 122 on its fulcrum 123 is the same as that heretofore described in connection with Fig. 2 and the various parts thereof have been designated by similar numerals.

In operation, when the changing-over mechanism has rocked the switch lever 122 to a neutral position as heretofore described in connection with Fig. 2, both pairs of valves 20, 20a and 102, 102a will be open. However, valve 73a will be moved to closed position so that only cooling fluid circulating through the valve chamber 101 and outer boiler absorber jackets 100 and 100a will be utilized to affect a heat exchange between the boiler absorbers 10 and 10a during the neutral position of the switch lever 122.

While in the foregoing description and in the annexed claims, the expressions "absorption" and "absorbent" have been used, they are intended to cover "adsorption" and "adsorbent;" and the changing-over devices herein disclosed operate with equal efficiency in an adsorption refrigerating system.

From the foregoing it is believed that the operation and advantages of the present invention will be readily understood by those skilled in the art without further description, it being borne in mind that numerous changes may be made in the details disclosed without departing from the spirit of the annexed claims.

What I claim is:

1. In absorption refrigerating apparatus of the class described including two units operating alternately and intermittently in the absorption and expulsion phases, respectively, each unit having a boiler absorber, means for heating the boiler absorber of each unit for the expulsion phase operation thereof, means for cooling the boiler absorber of each unit for the absorption phase operation thereof, valve means for controlling said cooling means, a changing-over device movable between two operating positions for selectively connecting and disconnecting said heating means and respectively closing and opening said valve means to control the operation of said units from one phase to the other, and separate elements responsive to the temperature of respective boiler absorbers for selectively actuating said changing-over device to its two operating positions; mechanism for effecting heat exchange between said boiler absorbers during the operation of said changing-over device, comprising a pair of members movable into and out of the path of movement of said changing-over device intermediate the two operating positions of the latter for respectively arresting and releasing said changing-over device during its movement from one operating position to the other, and means operatively connecting said members to said temperature responsive elements for controlling the movement of said members.

2. In absorption refrigerating apparatus including at least two units operating alternately and intermittently in the absorption and expulsion phases, respectively, each unit having at least one boiler absorber containing solid absorbent material, a condenser, and an evaporator coupled in series and forming a primary circuit for a refrigerant, separate heating means for said boiler absorbers for the expulsion phase operation of said units, control elements for connecting and disconnecting said heating means, means for cooling said boiler absorbers for the absorption phase operation of said units, and separate valve means for controlling said cooling means to respective boiler chambers; mechanism for selectively controlling the operation of said units, comprising a movable member operatively connected to said valve means and said control elements, said member being movable to two extreme operating positions and a neutral position, movement of said member to one of said extreme operating positions connecting one of said heating means and closing one of said valve means, movement of said member to the other of said extreme operating positions connecting the other of said heating means and closing the other of said valve means, and movement of said member to said neutral position disconnecting both of said heating means and opening both of said valve means, whereby a heat exchange is effected between said boiler absorbers through said cooling means, movable means responsive to the temperature in respective boiler absorbers for selectively shifting said movable member to its respective extreme operating positions, and means cooperating with said movable means and said movable member for holding said member in neutral position during part of the movement of said movable means.

3. In absorption refrigerating apparatus of the class described including two units operating alternately and intermittently in the absorption and expulsion phases, respectively, each unit having a boiler absorber, means for heating the boiler absorber of each unit for the expulsion phase operation thereof, a plurality of elements including boiler absorber jackets, condensers, collecting tank, and valve chamber, all coupled in series and forming a circulating system for a cooling medium to cool the boiler absorber of each unit for the absorption phase operation thereof, valve means in said valve chamber for controlling the circulation of said cooling medium to the respective boiler absorber jackets, control means for connecting and disconnecting said heating means, pivoted means operatively connected to said valve means and control means and rockable between two extreme positions for selectively actuating said valve means and said control means, to change the operation of said units from one phase to the other, a snap-spring device for normally maintaining said pivoted means in its respective extreme positions, and oppositely disposed pressure responsive means in thermal relation with respective boiler absorbers for selectively rocking said pivoted means from one extreme position to the other; mechanism for effecting heat exchange between said boiler absorbers during a part of the operation of said units, comprising a pair of pivoted levers operatively connected to respective pressure responsive means and movable therewith, and abutment members on said levers adjacent opposite sides of said pivoted means, adapted to engage the latter during part of the movement of said levers to maintain said pivoted means in an intermediate position, disconnecting said heating means and opening said valve means to allow circulation of said cooling medium from one boiler absorber jacket to the other, further movement of said levers by said pressure responsive means releasing said pivoted means, whereby the latter is shifted to its full operating position by said spring device.

4. In absorption refrigerating apparatus of the class described and including two units operating alternately and intermittently in the absorption and expulsion phases, respectively, each unit having a boiler absorber, separate electric heat cartridges for heating the boiler absorber of each unit in the expulsion phase operation thereof, a closed circulation system for a cooling medium to cool the boiler absorber of each unit for the absorption phase operation thereof, valve means in said system for selectively controlling the circulation of the cooling medium to respective boiler absorbers, and separate fluid pressure systems in thermal contact with respective boiler absorbers; a snap switch device for controlling the operation of said units from one phase to the other, comprising a rocking member operatively connected to said heat cartridges and said valve means and movable between two extreme positions for selectively actuating said heat cartridges and said valve means, one of said extreme positions energizing the heat cartridge on one boiler absorber and closing the valve means controlling circulation of the cooling medium to the second boiler absorber, and the other extreme position of said rocking member energizing the heat cartridge to the second boiler absorber and closing the valve means controlling circulation of the cooling medium to the first boiler absorber, a pair of bellows diaphragm units cooperating with each side of said rocking member to move the latter alternately from one extreme position to the other and vice versa, spring means for urging said rocking member to its respective extreme position, and detent members operatively connected to respective bellows diaphragm units and movable thereby into the path of movement of said rocking member to hold the latter intermediate its extreme positions during part of the movement of said bellows diaphragm, disconnecting both of said heat cartridges and opening both of said valve means, whereby the cooling medium circulates from one boiler absorber to the other to effect a heat exchange between said boiler absorbers during a part of the operation of said units, further movement of said bellows diaphragm units moving said detent members to release said rocking member.

5. In absorption refrigerating apparatus of the class described, including two units operating alternately and intermittently in the absorption and expulsion phases, respectively, a closed system for cooling medium to cool the units for the absorption phase operation thereof, valve means for selectively controlling the circulation of said cooling medium to respective units, means for heating said units for the expulsion phase operation thereof, and a changing-over device operatively connected to said heating means and said valve means, responsive to the temperature in respective units and operable by the temperature in the unit operating in the expulsion phase to change the operation of said units from one phase to the other; mechanism for effecting heat exchange between said units during part of the operation of said apparatus, comprising a pair of movable members cooperating with said changing-over device for disconnecting both of said heating means and selectively controlling the circulation of cooling medium to both of said units, said movable members being responsive to the temperature in respective units and operable by the temperature of the unit which has been operating in the absorption phase prior to the operation of said changing-over device, whereby the heat taken up by said cooling medium from the hot unit is transmitted to the cold unit to pre-heat the latter prior to its being heated by said heating means.

6. In absorption refrigerating apparatus of the intermittent type having two units operating in alternate phase relation to one another, each unit having a boiler absorber, means for heating the boiler absorber of each unit with the expulsion phase operation thereof, and means for cooling the boiler absorber of each unit during the absorption phase operation thereof; the combination with a change-over device responsive to the temperature in each of said boiler absorbers and operable by the temperature in the boiler absorber of the unit operating in the expulsion phase, for controlling the operation of said units from one phase to the other; of separate means responsive to the temperature in respective boiler absorbers, cooperating with said change-over device to render said heating means inactive to supply heat to said boiler absorbers during operation of said change-over device, and to effect heat exchange between said boiler absorbers, whereby the heat from one boiler absorber is utilized to preheat the other prior to its being heated by said heating means.

7. In absorption refrigerating apparatus of the intermittent type, the combination with two units operating in alternate phase relation to one another and each having a boiler absorber, means for heating the boiler absorber of each unit for the expulsion phase operation thereof, a closed system for the circulation of a cooling medium to cool the boiler absorber of each unit during the absorption phase operation thereof, and valve means for selectively controlling the circulation of the cooling medium to the respective boiler absorbers; of a change-over device, responsive to the temperature in each of said boiler absorbers, operatively connected to said heating means and said valve means and operable by the temperature in the boiler absorber of the unit operating in the expulsion phase, for controlling the operation of said units from one phase to the other, and separate means responsive to the temperature in respective boiler absorbers, cooperating with said change-over device to render said heating means inactive to supply heat to said boiler absorbers during the operation of said change-over device, and to permit the circulation of said cooling medium from one boiler absorber to the other, whereby the heat taken up by the cooling medium from the hot boiler absorber is utilized to preheat the cold boiler absorber prior to its being heated by said heating means.

8. In absorption refrigerating apparatus of the intermittent type including at least two units operating in alternate phase relation to one another, each unit having a boiler absorber, means for heating said boiler absorbers, a secondary cooling system for the circulation of a cooling medium in heat exchange relation with said boiler absorbers, and valve means for selectively controlling the circulation of the cooling medium to said boiler absorbers; the combination with a change-over device, responsive to the temperature in each of said boiler absorbers, operatively connected to said valve means and said heating means and movable from one operating position to another by the temperature in the boiler absorber of the unit operating in the expulsion phase, to control the operation of said units from one phase to the other; of separate movable means responsive to the temperature in respective boiler absorbers, each of said movable means alternately cooperating with said change-over device during operation of the latter to interrupt the supply of heat to said boiler absorbers by said heating means, and to open said valve means to permit the circulation of the cooling medium from one boiler absorber to the other, whereby the heat taken up by said cooling medium from the hot boiler absorber is delivered to the cold boiler absorber to preheat the latter prior to its being heated by said heating means.

NILS ERLAND AF KLEEN.